K. E. W. JAGDMANN.

BUILDING BLOCK.

APPLICATION FILED DEC. 22, 1920.

Reissued Nov. 29, 1921.

15,237.

2 SHEETS—SHEET 1.

Inventor-
Karl E. W. Jagdmann,
By- D. Singer, Atty.

K. E. W. JAGDMANN.

BUILDING BLOCK.

APPLICATION FILED DEC. 22, 1920.

Reissued Nov. 29, 1921.

15,237.

2 SHEETS—SHEET 2.

Inventor-
Karl E. W. Jagdmann,
By- B. Singer, Atty.

UNITED STATES PATENT OFFICE.

KARL ERIK WILHELM JAGDMANN, OF STOCKHOLM, SWEDEN.

BUILDING-BLOCK.

15,237. Specification of Reissued Letters Patent. Reissued Nov. 29, 1921.

Original No. 1,306,962, dated June 17, 1919, Serial No. 255,712, filed September 25, 1918. Application for reissue filed December 22, 1920. Serial No. 432,598.

*To all whom it may concern:*

Be it known that I, KARL ERIK WILHELM JAGDMANN, a subject of the King of Sweden, residing at Karlbergsvagen, 80, Stockholm, Sweden, have invented a new and useful Building-Block, of which the following is a specification.

This invention relates to an improved form of block, adapted to be used in connection with floor and ceiling construction, together with an improved method of securing the same together.

In the accompanying drawings:—

Figure 1:
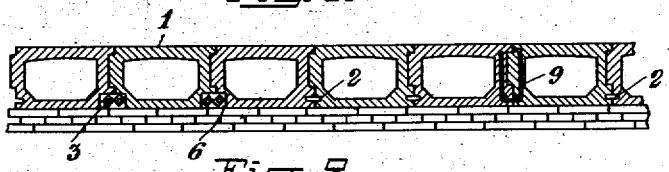
Figure 1 is a sectional end elevation.
Figure 2:
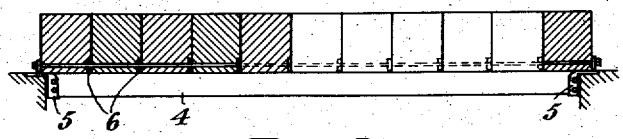
Fig. 2 is in part a side elevation and in part a section taken in the longitudinal direction of a row of blocks.
Figure 3:
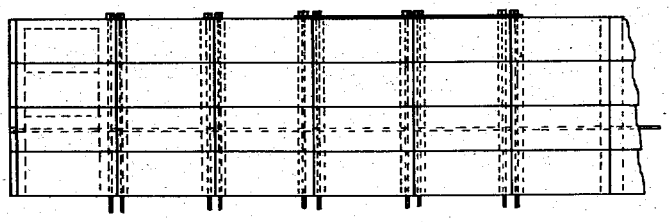
Figures 4, 5, 6:
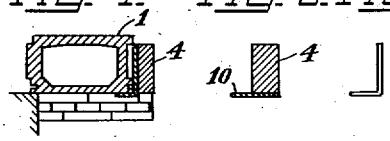

Fig. 3 a plan view thereof;

Fig. 4 a sectional end elevation of a modified form of block; and

Figure 7:
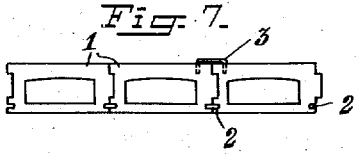
Figure 8:
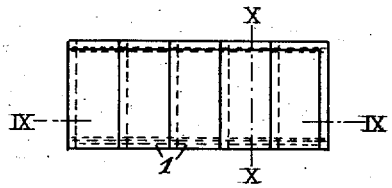
Figure 9:
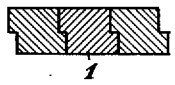
Figure 10:
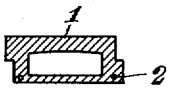
Figure 11:
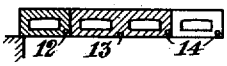
Figure 12:
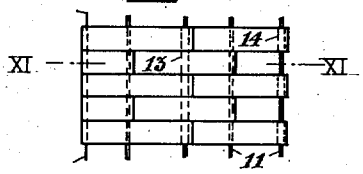

Figs. 5 and 6 details of construction adapted to be used in connection with the block illustrated in Fig. 4;

Fig. 7 is an end elevation, but showing a modified form;

Fig. 8 is a plan view of a number of blocks positioned together, without the use of reinforced metal; and Figs. 9 and 10 are details of the grooved joints adapted to be used in connection with the structure illustrated in Fig. 8;

Fig. 11 is a sectional view taken on the plane indicated by the line 11—11 of Fig. 12.

Fig. 12 is a plan view.

Figure 13:
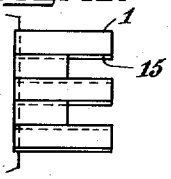
Figure 14:
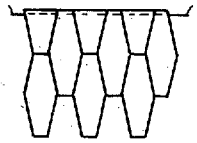
Figure 18:
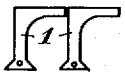
Figure 21:
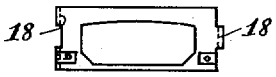
Figure 19:
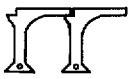
Figure 20:
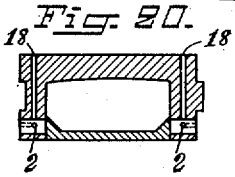
Figure 22:
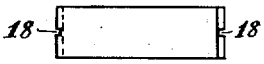

Fig. 13 illustrates a form of block which may be used without reinforced metal; and Fig. 14 illustrates still another method of laying the blocks;

Figs. 15, 16, 17 and 18 illustrate blocks constructed of two or more pieces;

Fig. 19 is a slightly modified form of the construction illustrated in Fig. 18; and Figs. 20, 21 and 22 illustrate details of construction to be used in connection with the reinforced bars.

Referring to the drawing, the floor consists of hollow blocks of concrete 1 which may be pressed mechanically in a factory or on the building place. The cavity may be divided by means of horizontal or vertical intermediate walls or filled up by a light substance. The blocks are provided with channels 2 into which the reinforcing metal 3 is inserted. Said channels may be made in the bottom and the four side surfaces of the block, so as to form so-called cross-reinforcement. To produce a floor, a beam 4, preferably a wooden beam, is placed in parallel to one wall of the room, said wall, preferably being smoothed on a level with the ceiling, at a distance about corresponding to the length of a block. Preferably, the said beam is suspended by stirrups 5 in such manner that the upper edge is on a level with the smooth wall. Then a series of blocks is laid down, some mortar or packings being inserted between them. The joint surfaces may preferably be dipped into thin cement paste or any other binding or tightening material. Then the reinforcing metal is introduced into the channels. To retain said metal in place, iron plates 6 or the like may be provided, one for each joint or for some of them, preferably those common to two reinforcing metal rods. In order to receive the shearing stress said plates may be substituted by stirrups of round iron 9.

One or more reinforcing rods may be provided for each line, two of them are however, to be preferred. The plates and, if desired, the stirrups are forced into the joints. To facilitate this operation recesses may be made in the blocks. The reinforcing metal is to be protected against rust by means of cement paste or in any other well-known manner. The ends of the rods are threaded and provided with nuts or any other locking device, so as to be capable of being tightened, for instance by means of wedges or eccentrics. The nuts having been tightened, the floor supports itself, and the beams are moved a distance corresponding to the length of a block. In this manner the lines are constructed one after another. In order to increase the connection of the floor and facilitate the construction thereof, the sides of the blocks are provided with rabbets 7, such rabbets being preferably also disposed in the vertical joint-surfaces. They may, if desired, be omitted altogether.

The beam may be placed on the smoothed surface of the wall and cantalivered on a level with said surface. Such a construction is shown in Figs. 4 and 5, the beam being provided with a cantaliver 10 supporting the blocks. The beam may be made of iron throughout having in such case the shape of an angle iron. This embodiment is shown in Fig. 6.

It is to be noted, that the beam may be omitted, if the reinforcing rods have their ends firmly secured to the side walls. This may, however, be used advantageously only in case of very small spans, because in greater spans the rods are liable to be bent and, consequently, the floor will become bowed at the middle.

The blocks may also be placed in bond. Preferably, a cross-reinforcement may be disposed in the middle of each floor.

The different blocks are designated by 1, the channels or apertures for the reinforcing metal by 2. According to Fig. 7 each block is connected with the preceding line by clamps 3 which, after the reinforcing metal has been tightened, may be removed.

Another method of laying out the blocks without molds or beams and gripping reinforcing metal is shown in Fig. 8. The method consists in providing the blocks with groove-joints in such a manner that the blocks in the first line rest on the supporting wall or the like, the blocks in the second line on the first line, the blocks in the third line on the second line and so on. A form of the groove-joints suitable in this case is shown in Figs. 9 and 10, being sectional views on lines 9—9 and 10—10 respectively in Fig. 8.

A further manner of performing such a method is shown in Figs. 11 and 12, Fig. 12 showing some lines viewed from above and Fig. 11 a section on line 11—11 in Fig. 12. According to this method the blocks are joined together in such a manner that each second or third block, etc. of the first line consists of two quartered blocks resting against the wall, a reinforcing rod 11 being introduced in apertures 12 made in the blocks. Then usual blocks are inserted in the interspaces between the two quartered blocks, the usual blocks resting, on the one hand, against the wall and on the other hand, against the reinforcing rod 11. To this purpose the usual blocks are provided with channels or grooves 13 in the lower side. Then another reinforcing rod is introduced in apertures 14 in the usual blocks, said rod serving in turn as a support for another line of usual blocks and so on.

Such a mounting of the blocks on the reinforcing metal may be avoided, if the blocks be provided with groove-joints, as shown on Fig. 13. In this case the groove-joints are indicated by 15, and it will appear distinctly from the figure that the blocks of each subsequent line are placed on the joints of the blocks in the next lower line. In this case the reinforcing metal may be introduced, after the lines of the blocks are laid out.

Fig. 14 shows still another method of laying out the blocks. In this case the blocks are preferably wedge-shaped to a certain extent. The blocks are introduced or forced in between the blocks previously laid out or reinforced.

This method is to be used in case of the reinforcing metal being provided with rivet heads, hooks or the like and tightened by widening the lines of blocks.

In practical use the blocks hereinbefore described have not proved quite satisfactory. Thus in case of great spans or heavy loads in which the case the blocks are very great and heavy it has proved to be of advantage to use blocks open at the bottom and provided with a false bottom preferably made of lighter material or to divide each block in two or more parts. The false bottom may also be omitted in which case the beams are visible from beneath or concealed by plastering or the like.

It is to be noted that the upper portion of the blocks ought, in general, to be of greater size than the lower portion, for instance twice as great, because the upper portion has to receive the greatest stresses.

Some embodiments of blocks produced according to the invention are shown in Figs. 15 to 22 inclusive.

Figure 15:
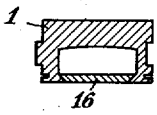

In Fig. 15 the block is U-shaped, a false bottom 16 of lighter or cheaper material being provided.

Figure 16:
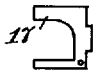

Fig. 16 shows a modified form of the block in Fig. 15, each block consisting of two halves.

Figure 17:
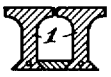

In Figs. 17, 18 and 19 the blocks are divided into T-shaped portions or in any other manner.

The blocks shown in Figs. 20, 21 and 22 are characterized by channels 18 leading to the apertures 2 for the reinforcing metal and serving for the filling in of the cement paste or the like. Said channels may be made in the material or in form of grooves in the joint surface.

It is to be noted that, if the apertures are provided with connecting channels, one vertical channel only is needed for each block.

Obviously, the grooves may be replaced by apertures 2, if conditions permit that the reinforced metal may be threaded through such apertures.

What is claimed is:—

1. Method of producing floors from rows of blocks placed beside one another, consisting in providing the joint surfaces of the blocks with mortar, preferably resting the blocks of the first row on a side support, and a removable support of a width corresponding to that of one or more blocks or about to such width, passing reinforcing metal through the blocks in each row, clamping the blocks of the row or rows together by means of said reinforcing metal so as to render the row or rows self sustaining, shifting after the completion of the said row or rows before the hardening of the mortar the removable support to the side a distance corresponding to the width of one or more blocks, placing the blocks of the subsequent row or rows close to the first row or rows on the removable support, and prosecuting the process in the manner set forth.

2. Method of producing floors from rows of blocks having holes or channels passing through the blocks in the longitudinal direction of the row, consisting in providing the joint surfaces of the blocks with mortar, placing the blocks of the first row beside one another, preferably resting said blocks on a temporary or permanent side support and a removable support of a width corresponding to that of one or more blocks or about to such width, inserting reinforcing metal in said holes or channels, clamping the blocks of the first row or rows together by means of the reinforcing metal so as to render the row or rows self-sustaining, shifting immediately after the completion of said row or rows before the hardening of the mortar, the removable support to the side a distance corresponding to the width of one or more blocks, placing the blocks of the subsequent row or rows on the removable support beside the first row or rows, pouring cement in the joints between the rows and prosecuting the process in the manner set forth.

3. Method of producing floors from rows of blocks placed beside one another, consisting in providing the joint surfaces of the blocks with mortar, resting the blocks of the first row on a side support and a removable support of a width corresponding to that of a block or about to such width, passing reinforcing metal through the blocks on each row, clamping the blocks of the row together by means of said reinforcing metal so as to render the row self-sustaining, shifting after the completion of the said row before the hardening of the mortar, the removable support to the side a distance about corresponding to the width of a block, placing the blocks of the second row close to the first row on the removable support, and prosecuting the process in the manner set forth.

4. Method of producing floors from rows of blocks placed beside one another, consisting in providing the joint surfaces of the blocks with mortar, resting the blocks of the first row on a side support and a removable support, passing reinforcing metal through the blocks in each row, clamping the blocks of the row together by means of said reinforcing metal so as to render the row self-sustaining, shifting after the completion of the said row before the hardening of the mortar, the removable support to the side a distance about corresponding to the width of a block, placing the blocks of the second row close to the first row on the removable support, and prosecuting the process in the manner set forth.

KARL ERIK WILHELM JAGDMANN.